US011586538B2

(12) United States Patent
Bang et al.

(10) Patent No.: US 11,586,538 B2
(45) Date of Patent: *Feb. 21, 2023

(54) STORAGE DEVICE AND STORAGE SYSTEM

(71) Applicant: SAMSUNG ELECTRONICS CO., LTD., Suwon-si (KR)

(72) Inventors: Kwang-Kyu Bang, Hwaseong-si (KR); Young-Min Kim, Seongnam-si (KR); Kwan-Bin Yim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/359,873

(22) Filed: Jun. 28, 2021

(65) Prior Publication Data
US 2021/0326258 A1    Oct. 21, 2021

Related U.S. Application Data

(63) Continuation of application No. 16/547,410, filed on Aug. 21, 2019, now Pat. No. 11,080,186.

(30) Foreign Application Priority Data

Dec. 20, 2018  (KR) .................. 10-2018-0166414

(51) Int. Cl.
*G06F 12/0804* (2016.01)
*G06F 3/06* (2006.01)

(52) U.S. Cl.
CPC ........ *G06F 12/0804* (2013.01); *G06F 3/0619* (2013.01); *G06F 3/0653* (2013.01);
(Continued)

(58) Field of Classification Search
CPC .... G06F 3/0689; G06F 3/0659; G06F 3/0653; G06F 3/0619; G06F 2212/1032; G06F 12/0804
See application file for complete search history.

(56) References Cited

U.S. PATENT DOCUMENTS 7,089,465 B2   8/2006  Lee
7,450,451 B2  11/2008  Nobukata
(Continued)

FOREIGN PATENT DOCUMENTS

JP    2007-242068 A    9/2007
JP    2011-081659 A    4/2011
(Continued)

OTHER PUBLICATIONS

US 9,915,993 B2, 03/2018, Tamura (withdrawn)
(Continued)

*Primary Examiner* — Edward J Dudek, Jr.
(74) *Attorney, Agent, or Firm* — Volentine, Whitt & Francos, PLLC

(57) ABSTRACT

Provided is a storage device including a power management integrated circuit chip; multiple non-volatile memories configured to receive power from the power management integrated circuit chip; and a controller configured to control the non-volatile memories, wherein the controller checks a state of the power during a read operation and a write operation on the non-volatile memories and, when a power failure is detected in at least one of the non-volatile memories, implements a power failure detection mode regarding the read operation and the write operation on all of the non-volatile memories.

20 Claims, 18 Drawing Sheets

(52) U.S. Cl.
CPC .......... *G06F 3/0659* (2013.01); *G06F 3/0689* (2013.01); *G06F 2212/1032* (2013.01)

(56) References Cited

U.S. PATENT DOCUMENTS

| | | | |
|---|---|---|---|
| 7,478,252 | B2 | 1/2009 | Yoon |
| 8,379,426 | B2 | 2/2013 | Bang et al. |
| 8,819,462 | B2 | 8/2014 | Cheong |
| 8,891,301 | B1 | 11/2014 | Shlick et al. |
| 9,606,864 | B2 | 3/2017 | Lee et al. |
| 9,640,281 | B1 | 5/2017 | Seo et al. |
| 9,830,993 | B2 | 11/2017 | Kong et al. |
| 9,847,134 | B2 | 12/2017 | Pao |
| 9,984,746 | B2 | 5/2018 | Kanai et al. |
| 10,064,305 | B1 | 8/2018 | Zhai et al. |
| 10,108,561 | B2 | 10/2018 | Park |
| 10,430,278 | B2 | 10/2019 | Lee |
| 10,552,362 | B2 | 2/2020 | Hong et al. |
| 11,080,186 | B2 * | 8/2021 | Bang ................ G06F 3/0679 |
| 2015/0153802 | A1 * | 6/2015 | Lucas ............... G06F 11/3062 714/22 |
| 2017/0315889 | A1 * | 11/2017 | Delaney ................ G06F 1/30 |
| 2017/0336816 | A1 | 11/2017 | Okajima et al. |
| 2018/0019656 | A1 | 1/2018 | Matsuda et al. |
| 2019/0036257 | A1 | 1/2019 | Lim |
| 2019/0042413 | A1 | 2/2019 | Wysocki et al. |
| 2019/0278486 | A1 | 9/2019 | Naruko et al. |

FOREIGN PATENT DOCUMENTS

| | | |
|---|---|---|
| JP | 2015-036988 A | 2/2015 |
| JP | 2016-181112 A | 10/2016 |
| KR | 10-2006-0068450 A | 6/2006 |
| KR | 100609038 B1 | 8/2006 |
| KR | 10-2009-0026117 A | 3/2009 |
| KR | 100922635 B1 | 10/2009 |
| KR | 10-2010-0039179 A | 4/2010 |
| KR | 10-2014-0045168 A | 4/2014 |
| KR | 10-2016-0104617 A | 9/2016 |
| KR | 10-2016-0143987 A | 12/2016 |
| KR | 101747797 B1 | 6/2017 |
| KR | 1020170085773 A | 7/2017 |
| KR | 1020170096427 A | 8/2017 |
| KR | 10-2017-0111375 A | 10/2017 |
| KR | 10-2018-0059201 A | 6/2018 |
| KR | 10-2018-0092430 A | 8/2018 |

OTHER PUBLICATIONS

Korean Notice of Allowance Cited in Korean Patent Application No. 10-2018-0166414 dated Dec. 4, 2020.
Korean Office Action dated Jul. 13, 2020 Cited in Korean Application No. KR 10-2018-0166414.

* cited by examiner

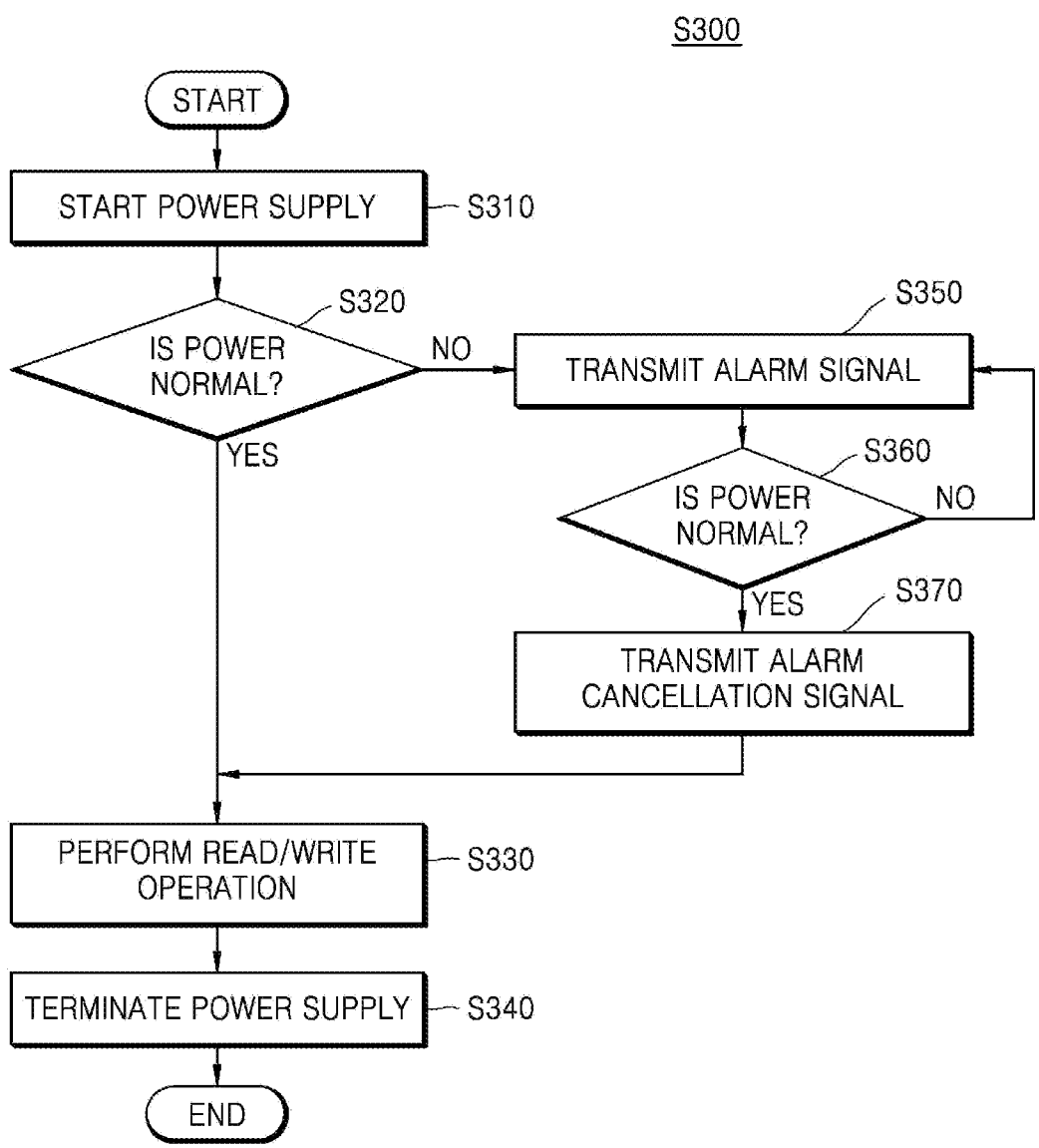

STORAGE DEVICE AND STORAGE SYSTEM

CROSS-REFERENCE TO RELATED APPLICATION

This is a Continuation of U.S. application Ser. No. 16/547,410, filed Aug. 21, 2019, which issued as U.S. Pat. No. 11,080,186 on Aug. 3, 2021, and a claim of priority under 35 U.S.C. § 119 is made to Korean Patent Application No. 10-2018-0166414, filed on Dec. 20, 2018 in the Korean Intellectual Property Office, the disclosures of which are incorporated herein in their entireties by reference.

BACKGROUND

1. Technical Field

The present disclosure relates to a storage device and a storage system. More particularly, the present disclosure relates to a storage device and a storage system including a power detection mode in which hardware and software operate in conjunction with each other.

2. Discussion of Related Art

A flash memory is used as a storage device in various fields due to advantages like non-volatility, large capacity and low noise. A storage device based on a flash memory is referred to as a solid state drive (SSD). A SSD includes multiple semiconductor elements like a controller and a flash memory, and the semiconductor elements are mounted on a printed circuit board and constitute a semiconductor package. In a storage device like the SSD, it is very important for the reliability of a product to find defect factors like power failure and to find a solution accordingly. However, as the integration of storage devices increases due to the development of semiconductor manufacturing technology, it is difficult to prevent all possible defects in advance.

SUMMARY

According to an aspect of the present disclosure, a storage device is provided with a power failure detection mode in which hardware and software are associated with each other to precisely detect a failure factor that may occur during operation of the storage device.

According to another aspect of the present disclosure, a storage system implements a power failure detection mode in which hardware and software are associated with each other to precisely detect a failure factor that may occur during operation of a storage device in the storage system.

According to another aspect of the present disclosure, a storage device includes a power management integrated circuit chip, multiple non-volatile memories, and a controller. The non-volatile memories are configured to receive power from the power management integrated circuit chip. The controller is configured to control the non-volatile memories. The controller checks a state of the power during a read operation and a write operation on the non-volatile memories and, when a power failure is detected in at least one of the non-volatile memories, implements a power failure detection mode regarding the read operation and the write operation on all of the non-volatile memories.

According to another aspect of the present disclosure, a storage system includes multiple storage devices and a host. Each storage device includes a power management integrated circuit chip, a non-volatile memory, and a controller. The power management integrated circuit chip of each storage device receives power from the power management integrated circuit chip. The controller of each storage device is configured to control the non-volatile memory of each storage. The host configures a multiple interface communication with the storage devices. The host checks a state of the power during a read operation and a write operation on the non-volatile memories included in the storage devices and, when a power failure is detected in at least one of the non-volatile memories, implements a power failure detection mode regarding the read operation and the write operation on all of the non-volatile memories.

According to another aspect of the present disclosure, a storage system includes multiple storage devices, a contact module, and a host. Each storage device includes a power management integrated circuit chip, a non-volatile memory, and a controller. The non-volatile memory of each storage device receives power from the power management integrated circuit chip of each storage device. The controller of each storage device is configured to control the non-volatile memory of each storage device. The contact module is capable of mounting the storage devices. The host is configured to communicate with the storage devices. The host switches the state of the power to a test mode while a read operation and a write operation are being performed on non-volatile memories included in the storage devices and collects information regarding whether to implement a power failure detection mode regarding the read operation and the write operation on the non-volatile memories.

BRIEF DESCRIPTION OF THE DRAWINGS

Embodiments of the present disclosure will be more clearly understood from the following detailed description taken in conjunction with the accompanying drawings in which:

FIG. 6 illustrates a flowchart for an alarm signal mode in a storage device according to an example embodiment;

DETAILED DESCRIPTION OF THE EMBODIMENTS

Figure 1:
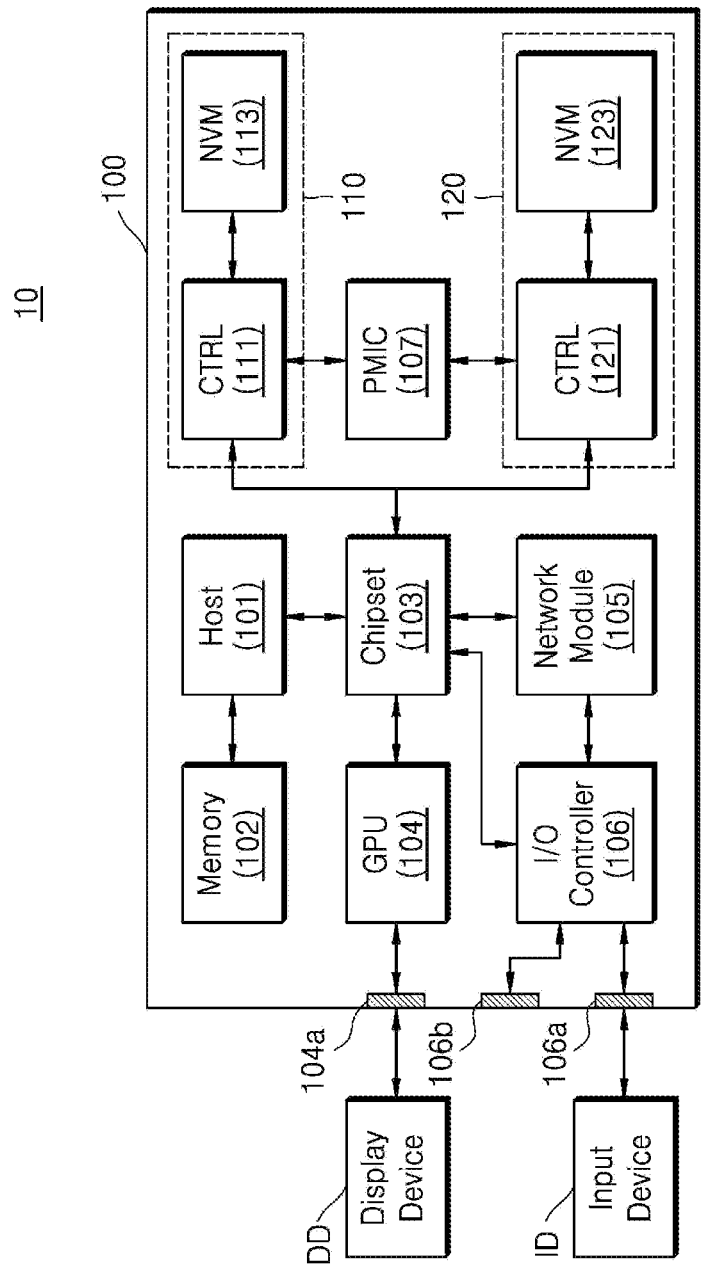
FIG. 1 illustrates a block diagram of a computing system including a storage device according to an example embodiment.

FIG. 1 illustrates a block diagram of a computing system including a storage device according to an example embodiment.

Referring to FIG. 1, each of a first storage device 110 and a second storage device 120 according to an example embodiment includes a program code for self-diagnosis in firmware and/or software.

Semiconductor devices included in the first storage device 110 and the second storage device 120 are mounted on a printed circuit board 100 of the computing system 10. After the first storage device 110 and the second storage device 120 are mounted on the printed circuit board 100, the computing system 10 may execute the program code, thereby performing self-diagnosis with respect to the first storage device 110 and the second storage device 120. Detailed descriptions of the program code will be given below with reference to FIGS. 5A and 5B.

For example, the computing system 10 may include at least one of a computer, a portable computer, a tablet computer, a workstation, a server, a mobile phone such as a smartphone, a digital camera, a device capable of transmitting and receiving information in a wired/wireless environment, and an electronic device constituting a home network system. The computing system 10 may include the printed circuit board 100 on which various hardware devices are mounted, a display device DD, and an input device (ID).

The first storage device 110, the second storage device 120, a host 101, a memory 102, a chipset 103, a graphics processing unit 104 (GPU), a network module 105, an input/output controller 106 (I/O Controller), a connector 104a, a control connector 106a and a control connector 106b, and a power management integrated circuit chip 107 (PMIC) may be mounted in respective dedicated areas provided on the printed circuit board 100. The connector 104a, the control connector 106a and the control connector 106b may each be, for example, an input/output socket.

The printed circuit board 100 may be a motherboard or a mainboard of the computing system 10. Various hardware for operating the computing system 10 may be mounted on the printed circuit board 100. In some embodiments, the printed circuit board 100 may include respective dedicated regions on which various hardware like a semiconductor package, a semiconductor device, a passive device, an active device, a control circuit, and/or an electronic circuit may be mounted.

The printed circuit board 100 may include various wires. The various wires may electrically connect various hardware mounted on the printed circuit board 100 to one another. The various hardware mounted on the printed circuit board 100 may communicate with one another through various wires.

The first storage device 110 may include a first controller 111 and a first non-volatile memory 113, and the second storage device 120 may include a second controller 121 and a second non-volatile memory 123. Of course, the number of storage devices mounted on the printed circuit board 100 is not limited to the two storage devices, i.e., to just the first storage device 110 and the second storage device 120.

The first controller 111 and the second controller 121 may control the first non-volatile memory 113 and the second non-volatile memory 123 according to commands of the host 101. The first controller 111 and the second controller 121 may each be a processor, such as a microprocessor or application integrated circuit (ASIC). For example, the first controller 111 and the second controller 121 read or are configured to read data stored in the first non-volatile memory 113 and the second non-volatile memory 123 or program data to the first non-volatile memory 113 and the second non-volatile memory 123 according to commands of the host 101. In some embodiments, the first controller 111 and the second controller 121 may communicate with the host 101 via the chipset 103.

The first non-volatile memory 113 and the second non-volatile memory 123 may include various non-volatile memories like a flash memory, a phase-change RAM (PRAM), a resistive RAM (RRAM), a ferroelectric RAM (FRAM). For convenience of explanation, it is assumed that the first non-volatile memory 113 and the second non-volatile memory 123 are NAND flash memories. Of course, the number of non-volatile memories mounted on the printed circuit board 100 is not limited to just two, i.e., to the first non-volatile memory 113 and the second non-volatile memory 123.

The first storage device 110 and the second storage device 120 may be used as mass storage media of the computing system 10. In some embodiments, the first non-volatile memory 113 and the second non-volatile memory 123 may constitute a redundant array of independent disks (RAID).

The first controller 111, the second controller 121, the first non-volatile memory 113, and the second non-volatile memory 123 of the first storage device 110 and the second storage device 120 may be mounted on the printed circuit board 100. In other words, each of the first storage device 110 and the second storage device 120 may be configured as an on-board storage medium or an on-board solid state drive (SSD).

The host 101 may perform some or all operations needed for the computing system 10 to operate. For example, the host 101 may interpret a command input by a user and perform a calculation and process data based on an interpreted command. The host 101 may be referred to as a central processing unit (CPU) and may include one or more processors that execute instructions from the memory 102.

The memory 102 may be used as the main memory of the computing system 10. The memory 102 may include a volatile memory like a DRAM, an SRAM, and a double data rate (DDR) DRAM. In some embodiments, the memory 102 may be mounted on the printed circuit board 100 and electrically connected to the host 101 via a wire provided on the printed circuit board 100.

The chipset 103 is a device that controls various hardware included in the computing system 10 according to commands of the host 101. For example, the chipset 103 may control the first storage device 110, the second storage device 120, the graphics processing unit 104, the network module 105, and the input/output controller 106, etc., according to commands of the host 101. Control by the chipset 103 may include initiating an operation, terminating an operation, coordinating an operation, selecting among multiple operations for an operation, or otherwise performing control consistent with descriptions herein.

In some embodiments, the chipset 103 may be mounted on a printed circuit board 100 and electrically connected to various hardware through wires provided on the printed circuit board 100. In addition, the chipset 103 may communicate with various hardware through a pre-set interface. For example, the pre-set interface may be configured to include at least one of various interfaces like USB, PCI, ATA, SCSI, ESDI, IDE, Firewire, UFS, and I2C. Insofar as the host 101 may be configured to communicate with the storage devices over multiple interfaces implemented by the chipset 103, the host 101 may be said to configure a multiple interface communication (MIC) with the storage devices.

The graphics processing unit 104 may convert a result of calculation or data processed by the host 101 into video signals. Converted video signals may be output via the display device DD. In some embodiments, the graphics processing unit 104 may be mounted on the printed circuit board 100 and connected to the chipset 103 and the connector 104a via wires provided on the printed circuit board 100. In some embodiments, the graphics processing unit 104 may be included in the host 101. Also, the connector 104a may be directly connected to the display device DD.

The network module 105 supports a wired or wireless communication with the outside of the computing system 10. For example, the network module 105 may support a wireless communications like CDMA, GSM, WCDMA, TDMA, LTE, Bluetooth, and WiFi. In some embodiments, the network module 105 may be mounted on the printed circuit board 100 and connected to the chipset 103 via a wire provided on the printed circuit board 100.

The input/output controller 106 may process information input from the input device (ID) or the control connector 106a and the control connector 106b. The input/output controller 106 may be connected to and manage the control connector 106a and the control connector 106b. In some embodiments, the input/output controller 106 may be mounted on the printed circuit board 100 and connected to the control connector 106a and the control connector 106b via wires provided on the printed circuit board 100. For example, the control connector 106a and the control connector 106b may include at least one of various input/output terminals like a PS2 port, a PCI slot, a DIMM slot, a USB terminal, a RGB port, a DVI port, and an HDMI port.

The power management integrated circuit chip 107 may supply power to various hardware of the computing system 10 based on an externally supplied power. For example, the power management integrated circuit chip 107 may supply power to the first storage device 110 and the second storage device 120. In some embodiments, the power management integrated circuit chip 107 may provide dedicated power for the first storage device 110 and the second storage device 120.

The power management integrated circuit chip 107 according to the present disclosure may include a power failure detection circuit capable of detecting an abnormal output of a power supply rail and provide an abnormal output status detected by the power failure detection circuit to the first storage device 110 and the second storage device 120 by using a side band protocol. Therefore, power supply failure (e.g., interruption) may be performed in several ways by several different elements including the power management integrated circuit chip 107.

Each of the first storage device 110 and the second storage device 120 according to the present disclosure may include power diagnostic firmware and/or power diagnostic software (hereinafter referred to as program codes). The program codes may include information or a program for checking the power state of the first storage device 110 and the second storage device 120 or may include information or a program needed to normally supply power. In some embodiments, the program codes may be stored in the form of power diagnostic firmware in the first controller 111 and the second controller 121 or stored in the first non-volatile memory 113 and the second non-volatile memory 123 in the form of power diagnostic software. As explained herein, the program codes may be executed or otherwise used as a basis to implement different modes for the first storage device 110 and the second storage device 120. The different modes may include a power failure detection mode, a test mode, and other types of modes described herein. Accordingly, the first controller 111 may detect failure or otherwise determine failure of the power when a read voltage and a write voltage provided to the first non-volatile memory 113 of the first storage device 110 is temporarily interrupted. The second controller 121 may detect failure or otherwise determine failure of the power when a read voltage and a write voltage provided to the second non-volatile memory 123 of the second storage device 120 is temporarily interrupted.

The first storage device 110 and the second storage device 120 may perform self-diagnosis on a power failure based on the program codes. For example, the first controller 111 and the second controller 121 may perform self-diagnosis by executing the power diagnostic firmware. The self-diagnosis may result in detection of power failure when the first controller 111 detects power failure when a read voltage and/or a write voltage provided to the non-volatile memories are temporarily interrupted, and/or when the second controller 121 detects power failure when a read voltage and/or a write voltage provided to the non-volatile memories are temporarily interrupted. On the other hand, the read operation and the write operation are performed when power failure is not detected, such as by normal processing.

Self-diagnosis of the first storage device 110 and the second storage device 120 according to the present disclosure may be performed during read/write operations of the computing system 10. For example, during processes for reading/writing data from/to the first non-volatile memory 113 and the second non-volatile memory 123, the first controller 111 and the second controller 121 may perform self-diagnosis on a power failure based on program codes.

Ultimately, according to the present disclosure, it may be determined whether a power failure of the first storage device 110 and the second storage device 120 exists (e.g., has occurred and/or is occurring) during read/write operations of the computing system 10. As a result, the reliability of the first storage device 110 and the second storage device 120 may be further assured. Therefore, the first storage device 110 and the second storage device 120 may be provided with improved reliability.

Figure 2:
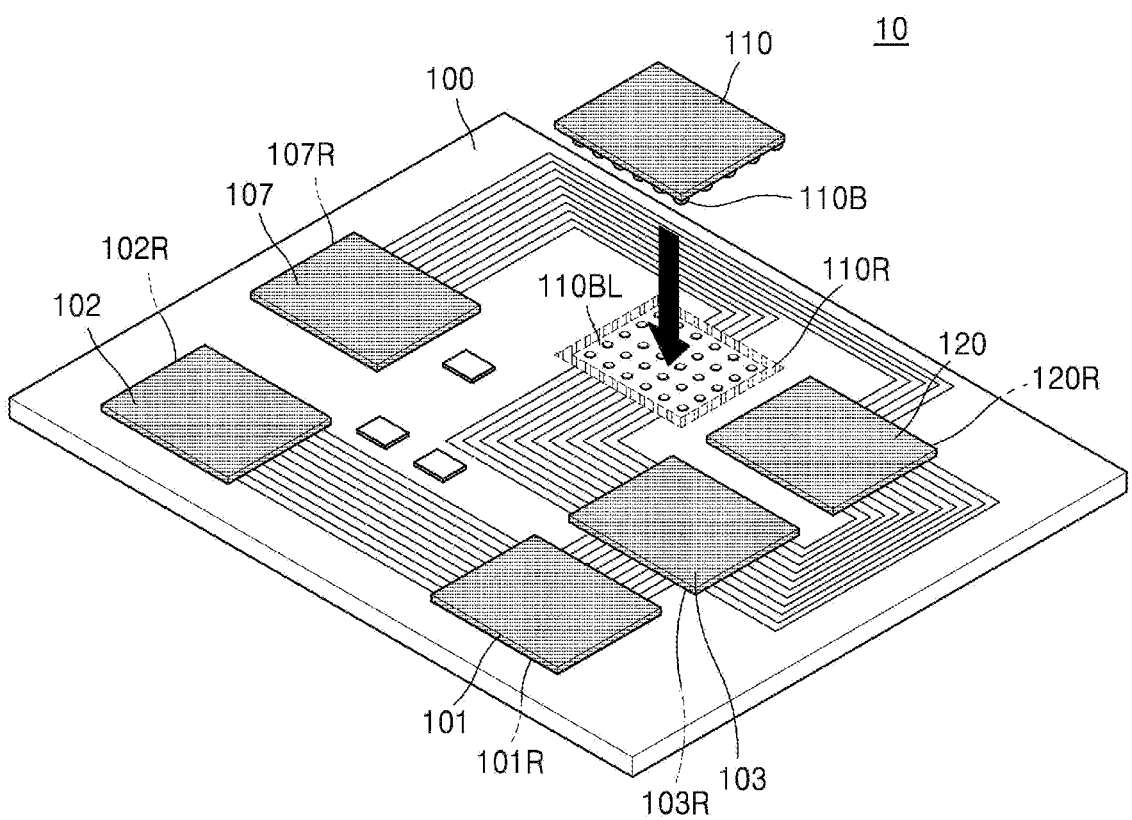
FIG. 2 is a schematic view illustrating a printed circuit board on which various hardware of FIG. 1 is mounted.

FIG. 2 is a schematic view illustrating a printed circuit board on which various hardware of FIG. 1 is mounted.

Referring to FIGS. 1 and 2 together, the computing system 10 may include various hardware mounted on the printed circuit board 100.

As described above, various hardware included in the computing system 10 may be mounted on the dedicated regions included in the printed circuit board 100, respectively. For example, the printed circuit board 100 may include a dedicated region 101R for the host 101, a dedicated region 102R for the memory 102, a dedicated region 103R for the chipset 103, a dedicated region 107R for the power management integrated circuit chip 107, a dedicated region 110R for the first storage device 110, and a dedicated region 120R for the second storage device 120. Dedicated regions may be electrically connected to one another through various wires provided on the printed circuit board 100.

The first controller 111 and the first non-volatile memory 113 of the first storage device 110 according to the present disclosure may be configured as an one-body package. In the same regard, the second controller 121 and the second non-volatile memory 123 of the second storage device 120 may be configured as an one-body package. A one-body package may refer to an integrated package, an integral package, a package with a single outer enclosure, a package with elements manufactured or otherwise constructed together with elements connected or otherwise attached, and so on.

In some embodiments, each of the first storage device 110 and the second storage device 120 may be provided as a ball grid array type solid state drive. A ball grid array may also be referred to by the acronym BGA. For example, the first storage device 110 may include a solder ball 110B as an external connection terminal, and the first storage device 110 may be mounted on the printed circuit board 100, such that a ball land 110BL located in the dedicated region 110R is coupled to the solder ball 110B. In the same regard, the second storage device 120 may be mounted on the printed circuit board 100. The first storage device 110 and the second storage device 120 may be mounted on the printed circuit board 100 using a surface mounting technology.

Although not shown, the first storage device 110 and the second storage device 120 may further include other non-volatile memories in addition to the first non-volatile memory 113 and the second non-volatile memory 123. Also, the first storage device 110 and the second storage device 120 may be mounted on different surfaces of the printed circuit board 100, respectively. For example, the first storage device 110 may be mounted on the top surface of the printed circuit board 100, and the second storage device 120 may be mounted on the bottom surface, which is the surface opposite to the top surface.

The first storage device 110 and the second storage device 120 may transmit results of self-diagnosis using the program codes to the host 101 by using the sideband protocol. In some embodiments, the sideband protocol may further include communication protocols like I2C (Inter-Integrated Circuit protocol), MCTP (Management Component Transport Protocol), and SMBus (System Management Bus protocol), which are provided in addition to a communication protocol provided for normal operation.

In some embodiments, the program codes may include information for performing a series of operations for detecting whether a power failure of the first storage device 110 and the second storage device 120 exists (e.g., has occurred or is occurring) or a power failure in configurations included in the first storage device 110 and the second storage device 120 exists (e.g., has occurred or is occurring). The program codes may include information for transmitting a result of self-diagnosis to the host 101. The first storage device 110 and the second storage device 120 according to the present disclosure may perform self-diagnosis operations by using the program codes based on power supplied from the power management integrated circuit chip 107. Therefore, as noted above with respect to the power management integrated circuit chip 107, power supply failure (e.g., interruption) may be performed in several ways by several different elements including the power management integrated circuit chip 107, but also including the program codes stored in the first non-volatile memory 113 and the second non-volatile memory 123 and executed or otherwise implemented by the first controller 111 and the second controller 121 Therefore, in the first storage device 110 and the second storage device 120, the detection may be performed by the first controller 111 and the second controller 121, respectively.

Although not shown, the first storage device 110 and the power management integrated circuit chip 107 according to the present disclosure may be configured as an one-body package. In the same regard, the second storage device 120 and the power management integrated circuit chip 107 may be configured as an one-body package. As noted above, a one-body package may refer to an integrated package, an integral package, a package with a single outer enclosure, a package with elements manufactured or otherwise constructed together with elements connected or otherwise attached, and so on.

Additionally, when the first controller 111 and the first non-volatile memory 113 are provided as a one-body package, the power management integrated circuit chip 107 and the one-body package may be or are mounted on one printed circuit board. The same is or may be true when the second controller 121 and the second non-volatile memory 123 are provided as a one-body package, such that the power management integrated circuit chip 107 and the one-body package may be or are mounted on one printed circuit board. Additionally, the power management integrated circuit chip 107 may be mounted on one printed circuit board with multiple one-body packages, such as a first one-body package with the first controller 111 and the first non-volatile memory 113, and a second one-body package with the second controller 121 and the second non-volatile memory 123.

Figure 3:
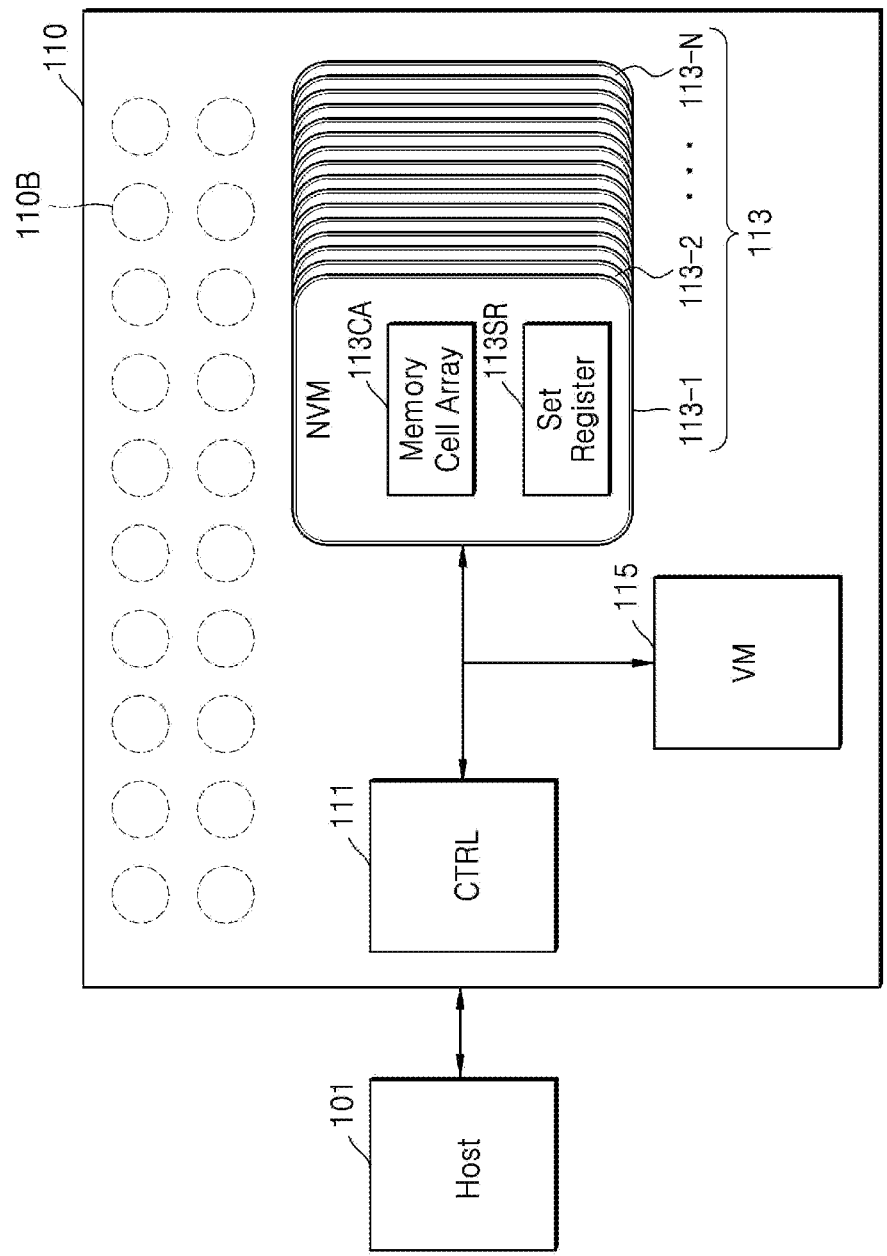
FIG. 3 illustrates a block diagram of a storage device according to an example embodiment.

FIG. 3 illustrates a block diagram of a storage device according to an example embodiment.

Referring to FIG. 3, the first storage device 110 may include a first controller 111, multiple non-volatile memories 113-1 to 113-N, and a volatile memory 115.

In response to a request from the host 101 connected to the first storage device 110, the first controller 111 may control read operations, write operations, erase operations, and/or initialize operations regarding the non-volatile memories 113-1 to 113-N.

The volatile memory 115 may temporarily store data provided from the host 101 or data read from the non-volatile memories 113-1 to 113-N. The volatile memory 115 may store metadata or cache data to be stored in the non-volatile memories 113-1 to 113-N. The volatile memory 115 may include, for example, a DRAM, a SRAM, and the like.

The non-volatile memories 113-1 to 113-N are used as storage media of the first storage device 110. Each of the non-volatile memories 113-1 to 113-N may be, for example, a NAND flash memory. The non-volatile memories 113-1 to 113-N may be connected to the first controller 111 through a channel.

Each of the non-volatile memories 113-1 to 113-N may include a memory cell array 113CA and a set register 113SR. The set register 113SR may set initialization information indicating the product specification of a corresponding non-volatile memory read through an operation for reading the initialization information during a boot time. Furthermore, the set register 113SR may set control signals and data for operation options, functions, characteristics, and operation modes of a corresponding non-volatile memory received from the first controller 111.

Each of the non-volatile memories 113-1 to 113-N may store protection information for prohibiting write/erase operations, trimming data for trimming an operation voltage level in an operation mode, column repair information for repairing a failed bit line, and bad block information including bad memory cells as initialization information in a portion of the memory cell array 113CA. The trimming data is data used not only to set the operation modes of each of the plurality of non-volatile memories 113-1 to 113-N, that is, to set voltage adjustment in a read operation, a write operation, and an erase operation, but also to adjust of a sense amplifier or a page buffer and to optimize a reference cell.

Each of the non-volatile memories 113-1 to 113-N may store power diagnostic software, which includes information for performing a series of operations for detecting a power failure, as program codes in a portion of the memory cell array 113CA. The program codes may include information for transmitting a result of self-diagnosis to the host 101. In other words, the first storage device 110 according to the present disclosure may perform a self-diagnosis operation by using the program codes.

Figure 4:
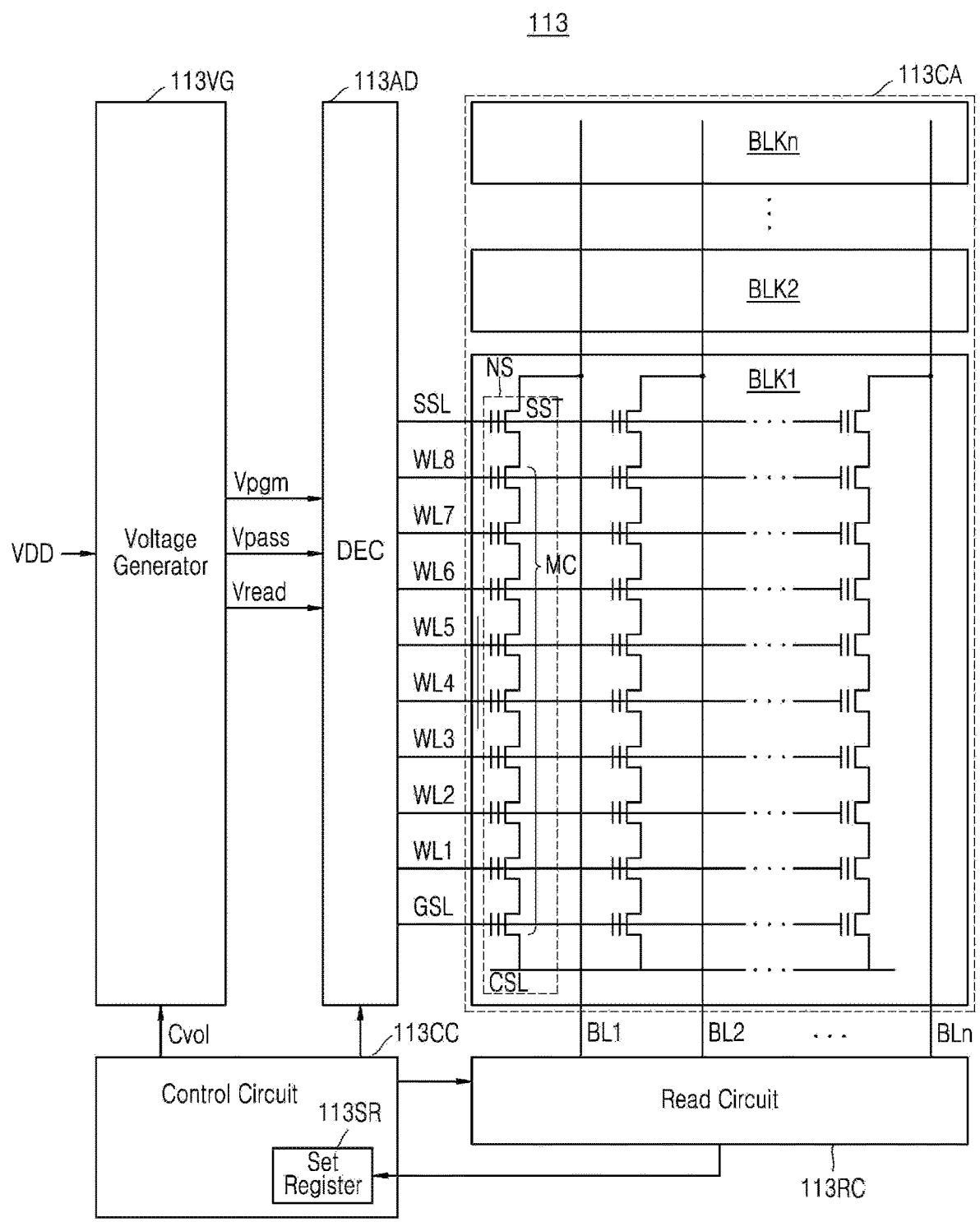
FIG. 4 illustrates a block diagram for describing a non-volatile memory of the storage device of FIG. 3.

FIG. 4 illustrates a block diagram for describing a non-volatile memory of the storage device of FIG. 3.

Referring to FIG. 4, the first non-volatile memory 113 may include the memory cell array 113CA, a control circuit 113CC, an address decoder 113AD, a read circuit 113RC, and a voltage generator 113VG.

Although not shown, the first non-volatile memory 113 may further include a write circuit and an input/output circuit. The write circuit may be configured as a write driver that receives data provided from the first controller 111 (see FIG. 3) to the input/output circuit through an input/output line and stores the received data in the memory cell array 113CA. The input/output circuit may temporarily store commands, addresses, control signals, and data provided from the first controller 111 (see FIG. 3) through the input/output line. The input/output circuit temporarily may store read data of the first non-volatile memory 113 and output the read data to the first controller 111 (see FIG. 3) through the input/output line at a designated time.

The memory cell array 113CA may include multiple memory cells. For example, the memory cells may be NAND flash memory cells. In some embodiments, the memory cell array 113CA may include a 3-dimensional memory cell array including multiple NAND strings NS.

The 3-dimensional memory cell array 113CA may include monolithically-formed physical levels of memory cell arrays 113CA including active regions disposed on a silicon (Si) substrate and circuits formed on or in the Si substrate. The memory cell array 113CA is three-dimensional and includes a NAND string NS arranged in a vertical direction, such that at least one memory cell is located above another memory cell.

The memory cell array 113CA may include multiple memory blocks BLK1 to BLKn. Each memory block may be connected to a string select line SSL, a word line WL, a ground select line GSL, and a bit line BL. Each memory block may be connected to the address decoder 113AD via the string select line SSL, the word line WL, and the ground select line GSL and connected to the read circuit 113RC via the bit line BL.

A first memory block BLK1 may include multiple NAND strings NS, and each of the NAND strings NS may include a string select transistor SST, multiple memory cells MC, and a ground select transistor GST. The string select transistor SST are connected to the string select line SSL, the memory cells MC are respectively connected to corresponding word lines WL1 to WL8, and the ground select transistor GST is connected to the ground select line GSL. String select transistors SST are respectively connected to corresponding bit line BL1 to BLn, and the ground select transistor GST is connected to a common source line CSL.

The numbers of rows and columns of the NAND strings NS in the first memory block BLK1 may increase or decrease. As the number of rows of the NAND strings NS is changed, the number of word lines WL may be changed. As the number of columns of the NAND strings NS is changed, the number of bit lines BL connected to the columns of the NAND string NS and the number of the NAND strings NS connected to one string select line SSL may be changed. The height of the NAND string NS may be increased or decreased. For example, the number of memory cells stacked on each NAND string NS may be increased or decreased.

1-bit data may be stored in memory cells of the first memory block BLK1. A memory cell capable of storing 1-bit data per memory cell may be referred to as a single-level cell (SLC) or a single-bit cell. The first memory block BLK1 may be configured as a block for storing initialization information of the first non-volatile memory 113. In some embodiments, the memory cells of the first memory block BLK1 may store power supply diagnostic software that includes information for performing a series of operations for detecting a power failure in the form of program codes.

Each of second to n-th memory blocks BLK2 to BLKn may include multiple memory cells and multiple select transistors in the same manner as the first memory block BLK1. The second to n-th memory blocks BLK2 to BLKn may be configured as blocks for storing data transmitted from the first controller 111 (see FIG. 3). Memory cells of the second through n-th memory blocks BLK2 through BLKn may include single level cells or multi level cells capable of storing two or more bits of data per memory cell.

The control circuit 113CC may control all operations of the first non-volatile memory 113. The control circuit 113CC may control a read operation, a write operation, and/or an erase operation on the memory cell array 113CA based on commands, addresses, and control signals received from the first controller 111.

The control circuit 113CC may provide a row address to the address decoder 113AD, provide a column address to the read circuit 113RC, and provide a voltage control signal Cvol to the voltage generator 113VG.

The control circuit 113CC may control an operation for reading initialization information stored in the first memory block BLK1 of the memory cell array 113CA. The control circuit 113CC may control the level of a read pass voltage Vread needed for performing the operation for reading the initialization information. The control circuit 113CC may control the level of the read pass voltage Vread to be below the level of the power voltage VDD during the operation for reading the initialization information by using the voltage control signal Cvol provided by the voltage generator 113VG.

The control circuit 113CC may include a set register 113SR set to the initialization information read in the operation for reading the initialization information. In some embodiments, the set register 113SR may not be embedded in the control circuit 113CC.

The address decoder 113AD may select one of the memory blocks BLK1 to BLKn of the memory cell array 113CA and may transfer a word line voltage to the word line WL of the selected memory block. During a write operation, a program voltage Vpgm is provided to a selected word line and a pass voltage Vpass is provided to unselected word lines. During a read operation, a read voltage Vread is provided to the selected word line, and the pass voltage Vpass is provided to the unselected word lines.

The read circuit 113RC may read data from the second to n-th memory blocks BLK2 to BLKn of the memory cell array 113CA and transfer read data to a data input/output circuit that outputs read data to the first controller 111 (see FIG. 3). Also, the read circuit 113RC may read initialization information stored in the first memory block BLK1 of the memory cell array 113CA and set read initialization information to the set register 113SR of the control circuit 113CC during the operation for reading the initialization information. The read circuit 113RC may include a page buffer or a page register for reading data, a column selection circuit for selecting a bit line BL, etc.

The voltage generator 113VG may generate a voltage to be provided to the word line WL of the memory cell array 113CA (i.e., a word line voltage) in response to the control of the control circuit 113CC. The voltage generator 113VG may generate the program voltage Vpgm, the pass voltage Vpass, and the read voltage Vread. The voltage generator 113VG may receive the power voltage VDD from the first controller 111 (see FIG. 3). In some embodiments, the voltage generator 113VG may receive the power voltage VDD from the power management integrated circuit chip 107 (see FIG. 1).

In a storage device according to the present disclosure, a power failure that has occurred and/or is occurring may be detected or otherwise determined when a power glitch from about several nanoseconds to dozens of nanoseconds occurs in the program voltage Vpgm and/or the read voltage Vread. Due to the power failure, an uncorrectable error correction code (UECC) failure may occur in a selected memory block of the memory cell array 113CA. The uncorrectable error correction code may be identified by a controller such as the first controller 111 or the second controller 121 executing or otherwise implementing program codes that are stored in the first non-volatile memory 113 or the second non-volatile memory 123.

Figure 5A:
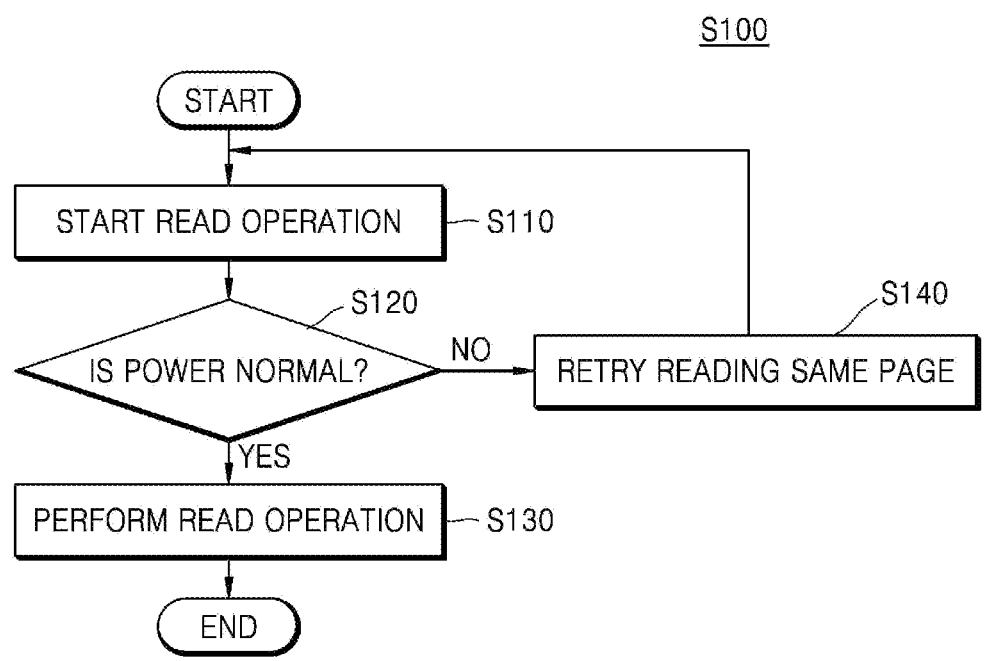
FIGS. 5A and 5B illustrate flowcharts of read/write operations in a storage device according to an example embodiment.
Figure 5B:
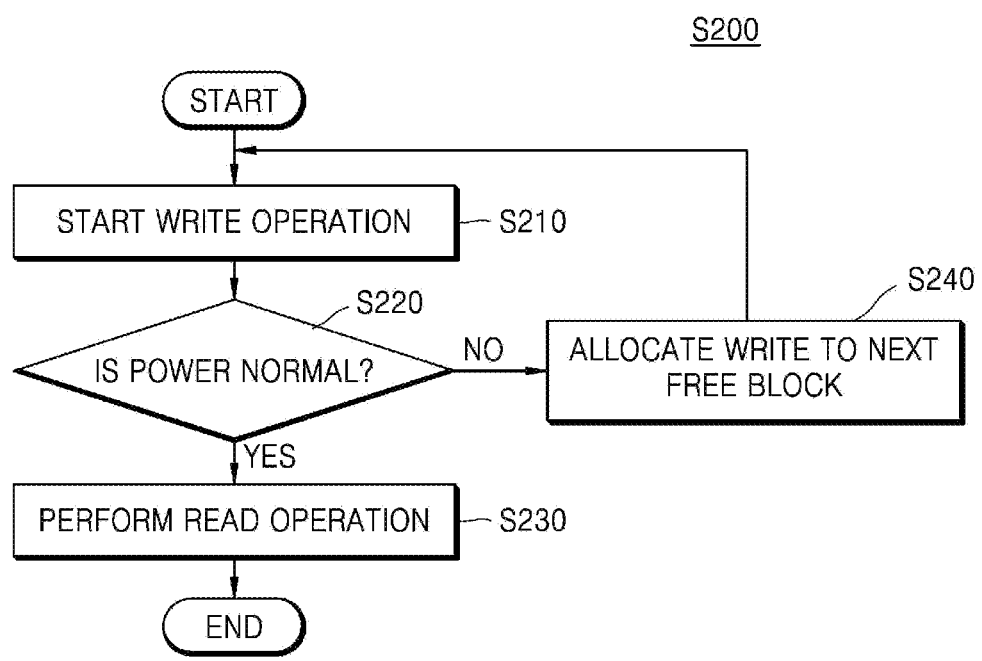

FIGS. 5A and 5B illustrate flowcharts of read/write operations in a storage device according to an example embodiment.

FIGS. 5A and 5B show a program code S100 for a read operation and a program code S200 for a write operation, respectively.

The program code S100 for the read operation includes an operation for starting a read operation (operation S110), an operation for determining whether power is normal (operation S120), an operation for performing the read operation (operation S130), and an operation for re-attempting to read a same page (operation S140). Put another way, when power is abnormal while attempting to read a first page or multiple first pages at S130, reading of the first page or multiple first pages is retried at S140. Additionally, while the determining whether power is normal at S120 is described here as occurring before performing the read operation at S130, the determining at S120 may be performed instead or in addition after S130 and even again after S140.

The program code S200 for the write operation includes an operation for starting a write operation (operation S210), an operation for determining whether power is normal (operation S220), an operation for performing the write operation (operation S230), and an operation for allocating a write (e.g., dedicating at least one address and space for a next write operation) to a next free block (operation S240). A write may be allocated by dedicating the next free block at S240 to a current or future write operation with a current or future write instruction.

The read operation and the write operations may be performed in the memory cell array of the storage device. The determination of whether power is normal during a read operation and a write operation may be implemented through a power failure detection circuit and program codes.

In other words, an error of a read operation and a write operation due to power failure of a storage device may be prevented in advance in a manner similar to implementation of a defense code in the storage device, by performing a self-diagnosis of power failure detection during a read operation and a write operation with a combination of hardware (a power failure detection circuit of a power management integrated circuit chip and/or a controller and/or a non-volatile memory that stores program codes) and software (program codes).

Also, a power failure detection circuit capable of detecting an abnormal output voltage of a power supply rail may be applied to a power management integrated circuit chip, and an abnormal output detected by the power failure detection circuit may be provided to a storage device by using a sideband protocol. In other words, a non-volatile memory with a power failure may be identified through a side interface between a power management integrated circuit chip and multiple non-volatile memories.

The program code S100 for a read operation will be described in detail. While a read operation is being performed in multiple non-volatile memories of a storage device, a power management integrated circuit chip detects an abnormal output voltage and determines whether power is normal and, when the power is normal, the read operation is performed in the same manner as in the normal state. When the power is abnormal, reading of the same page is retried (power failure detection mode) a determination whether power is normal is made again. In other words, the read operation may be continuously performed even during the determination of whether power is normal (operation S120). In other words, when power is not smoothly supplied, there is a high possibility that a read operation will not be normally performed. Therefore, by reading the same page again, an error of a read operation due to a power failure may be prevented. Put another way, when power is abnormal while attempting to read a first page or multiple first pages, reading of the first page or multiple first pages is retried during the read operation based on determining that power is not normal (S120=No).

The program code S200 for a write operation will be described in detail. While a write operation is being performed in multiple non-volatile memories of a storage device, a power management integrated circuit chip detects an abnormal output voltage and determines whether power is normal and, when the power is normal, the write operation is performed in the same manner as in the normal state. When power is abnormal, a write is allocated (e.g., dedicating at least one address and space for a next write operation) to a next free block (power failure detection mode) and a determination whether power supply is normal is made again. In other words, a write operation may be continuously performed even during the determination of whether power is normal (operation S220). In other words, when power is not smoothly supplied, there is a high possibility that a write operation will not be normally performed. Therefore, by allocating a write (e.g., dedicating at least one address and space for a next write operation) to another block, an error of a write operation due to a power failure may be prevented. Put another way, when power is abnormal while attempting a write operation to write to a first page or multiple first pages, writing to a next allocated free block is performed during the write operation based on determining that power is not normal (S220=No).

In other words, the program code S100 for a read operation and the program code S200 for a write operation may minimize data loss due to external factors like sudden interruption of power supplied from a power management integrated circuit chip. Also, the program code S100 for a read operation and the program code S200 for a write operation may improve data reliability in a state where power is unstable.

In some embodiments, the program code S100 for a read operation and the program code S200 for a write operation on multiple non-volatile memories of a storage device may implement a power failure detection mode on all of the non-volatile memories during the read operation and the write operation when a power failure is detected from at least one of the non-volatile memories. When a power failure is detected from any one of the non-volatile memories, power failure may likely occur in the other non-volatile memories at the same time point or at an adjacent time point. Therefore, to prevent an error in a read operation and a write operation due to power failure, the power failure detection mode is implemented on all of the non-volatile memories.

FIG. 6 illustrates a flowchart for an alarm signal mode in a storage device according to an example embodiment.

FIG. 6 shows an alarm signal mode S300 in which an alarm is transmitted when power failure is detected in a host communicating with multiple non-volatile memories.

The alarm signal mode S300 includes operation S310 for starting power supply, operation S320 and operation S360 for determining whether power is normal, operation S330 for performing read/write operations, operation S340 for terminating power supply, operation S350 for transmitting an alarm signal, and operation S370 for transmitting an alarm cancellation signal.

As described above, a read operation and a write operation may be performed in a memory cell array of a storage device. The determination of whether power is normal during a read operation and a write operation may be implemented through a power failure detection circuit and a program code.

The alarm signal mode S300 will be described in detail. When power failure is detected in at least one of multiple non-volatile memories, an alarm signal is transmitted to a host. After the alarm signal is transmitted, when no power failure is detected in all of the non-volatile memories, an alarm cancellation signal is transmitted to the host. The host and the non-volatile memories may constitute a multiple interface communication, thereby sharing an alarm signal for any one non-volatile memory with all of the non-volatile memories. That is, insofar as a host may be configured to communicate with the non-volatile memories over multiple interfaces (e.g., different types and/or instantiations of interfaces), the host and the non-volatile memories may be said to constitute a multiple interface communication (MIC). The host may communicate with the non-volatile memories over the multiple interfaces simultaneously, within the same time period, and/or at different times in accordance with the multiple interface communication.

Also, when no power failure is detected in all of the non-volatile memories while power is being supplied, power supply to the storage device is terminated after a read operation and a write operation are completed.

While a read operation and a write operation are being performed in multiple non-volatile memories of a storage device according to the present disclosure, when a power failure is detected in at least one of the non-volatile memories, an alarm signal is transmitted to a host, and a power failure detection mode regarding the read operation and the write operation may be performed on all of the non-volatile memories.

The host according to the present disclosure may analyze an alarm signal and an alarm cancellation signal and determine the cause of a power failure. In detail, the cause of a power failure may be determined by analyzing collected information like characteristics of a non-volatile memory corresponding to an alarm, an alarm occurring frequency, a start time and an end time of an alarm, and an alarm occurring interval, etc.

Figure 7:
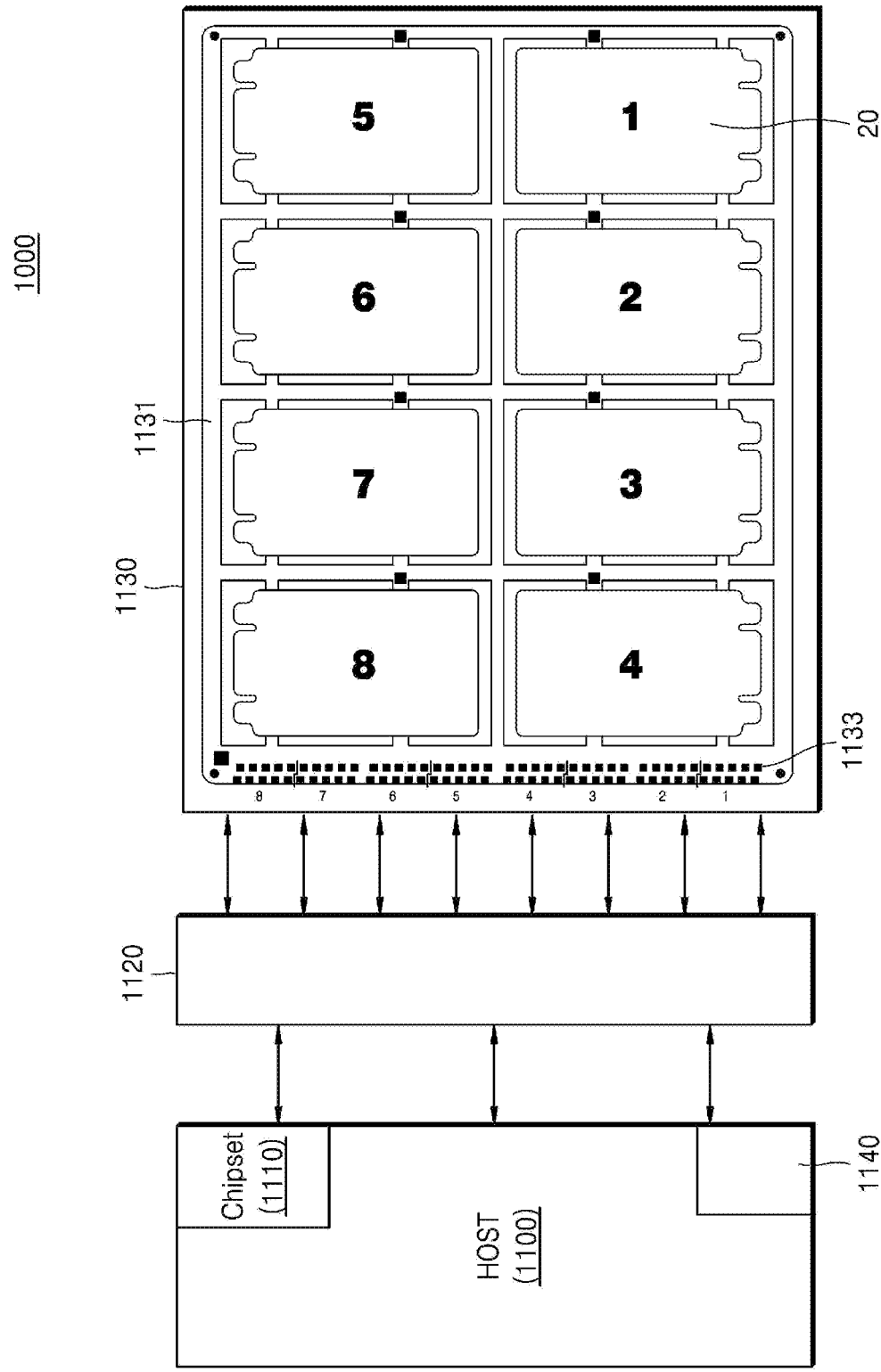
FIG. 7 illustrates a block diagram of a storage system according to an example embodiment.

FIG. 7 illustrates a block diagram of a storage system according to an example embodiment.

Referring to FIG. 7, a storage system 1000 includes a host 1100, a contact module 1120, and a test substrate 1130 on which multiple storage devices 20 are arranged.

The test substrate 1130 may exchange signals with the host 1100 and receive power through the contact module 1120. The test substrate 1130 includes the storage devices 20, a support 1131, and a test terminal 1133.

The host 1100 may perform all operations needed for the storage system 1000 to operate. For example, the host 1100 may interpret a command input from a user, perform a calculation operation or process data based on an interpreted instruction. The host 1100 may be referred to as a storage facility.

A chipset 1110 is a device that controls various hardware included in the storage system 1000 according to commands of the host 1100. For example, the chipset 1110 may test operations of the storage devices 20 through the test terminal 1133 according to a command of the host 1100.

The storage devices 20 are connected to the test substrate 1130 via the support 1131. The test terminal 1133 is connected to a signal line capable of electrically inspecting each of the storage devices 20 mounted on the test substrate 1130. The support 1131 may be provided with the test terminal 1133 on its surface. Therefore, the test terminal 1133 may be connected to the contact module 1120 to perform a failure analysis for each of the storage devices 20. Although FIG. 7 shows that the storage devices 20 includes eight consecutively arranged M.2 type solid state drives, the number of storage devices 20 arranged on the test substrate 1130 is not limited thereto.

Accordingly, it is not necessary to connect the storage devices 20 to the host 1100 separately during a failure analysis for the storage devices 20, a failure analysis time may be reduced. Also, when a connection between the storage devices 20 and the support 1131 is separated after a test is completed, each of the storage devices 20 may be provided as an M.2 type solid state drive.

Figure 8:
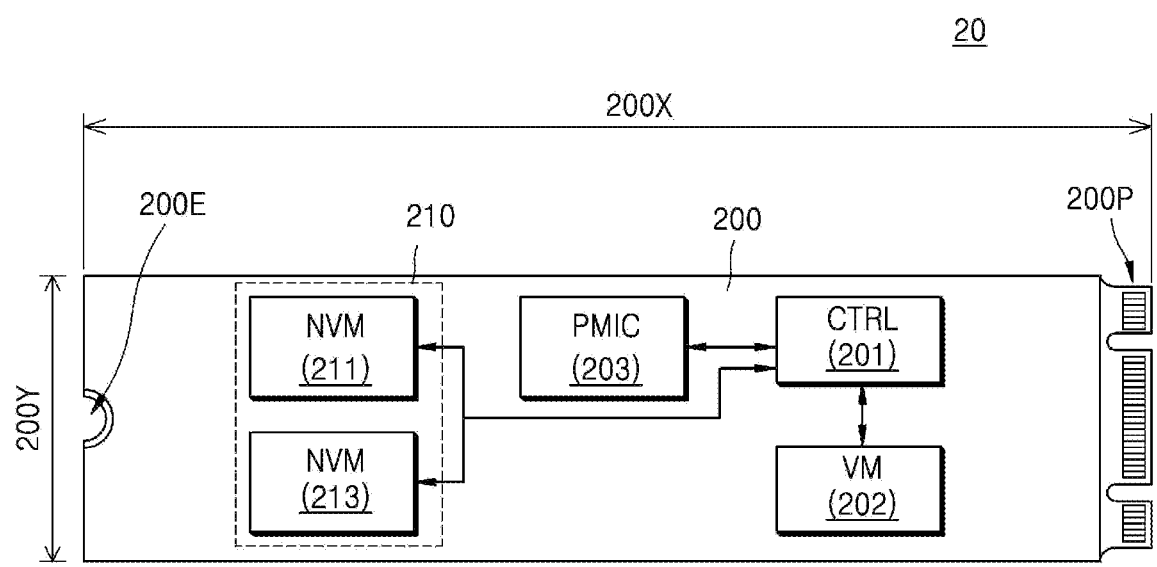
FIG. 8 illustrates a block diagram of a storage device included in a storage system according to an example embodiment.

FIG. 8 illustrates a block diagram of a storage device included in a storage system according to an example embodiment.

Referring to FIG. 8, a storage device 20 has a form factor of an M.2 type solid state drive and includes a printed circuit board 200 having mounted thereon various hardware.

Generally, the form factor of the M.2 type solid state drive defines a length 200Y of the printed circuit board 200 in the Y direction to be 22 mm and a length 200X in the X direction is to be 60 mm, 80 mm, or 110 mm.

As the sizes of electronic devices including the storage device 20 become smaller and the storage device 20 operating at a higher speed is demanded, the storage device 20 having a smaller size and supporting a high-speed interface protocol is demanded. Therefore, a form factor corresponding to a relatively small size, e.g., an mSATA type using a PCI Express Mini Card layout and an M.2 type defining more flexible size than that defined by the mSATA type, have been proposed. The M.2 type defines a small size solid state drive as shown in FIG. 8, and the small size solid state drive may include at least one of the non-volatile memories 210 mounted on the printed circuit board 200.

The M.2 type may define a port 200P. The port 200P may be located at one side of the printed circuit board 200 and may include multiple pins for communicating with the host 1100 (see FIG. 7). The plurality of pins may constitute an exposed pattern and include a conductive material like copper (Cu).

Also, the M.2 type may also define a recess structure 200E for mounting and fixing the storage device 20 to the motherboard (or mainboard). The M.2 type may include a recess structure 200E that is semi-circular and on the other side of the printed circuit board 200 opposite to the side of the port 200P. The exposed pattern may be formed on edges of the recess structure 200E and may be connected to a conductor of the motherboard when the M.2 type mounted on the motherboard. For example, the pattern formed on the edges of the recess structure 200E may be connected to a conductor corresponding to a ground node of a motherboard.

A controller 201 may control a first non-volatile memory 211 and a second non-volatile memory 213 according to commands of the host 1100 (see FIG. 7). For example, the controller 201 may read data stored in the first non-volatile memory 211 and the second non-volatile memory 213 and read data stored in the first non-volatile memory 211 and the second non-volatile memory 213 according to commands of the host 1100 (see FIG. 7).

A memory 202 may include a volatile memory like a DRAM, an SRAM, and a DDR DRAM. In some embodiments, the memory 202 may be mounted on the printed circuit board 200 and electrically connected to the controller 201 via wires provided on the printed circuit board 200.

A power management integrated circuit chip 203 may supply power to the storage device 20 based on an externally supplied power. In some embodiments, as shown in FIG. 8, the power management integrated circuit chip 203 may provide power to the controller 201.

Figure 9A:
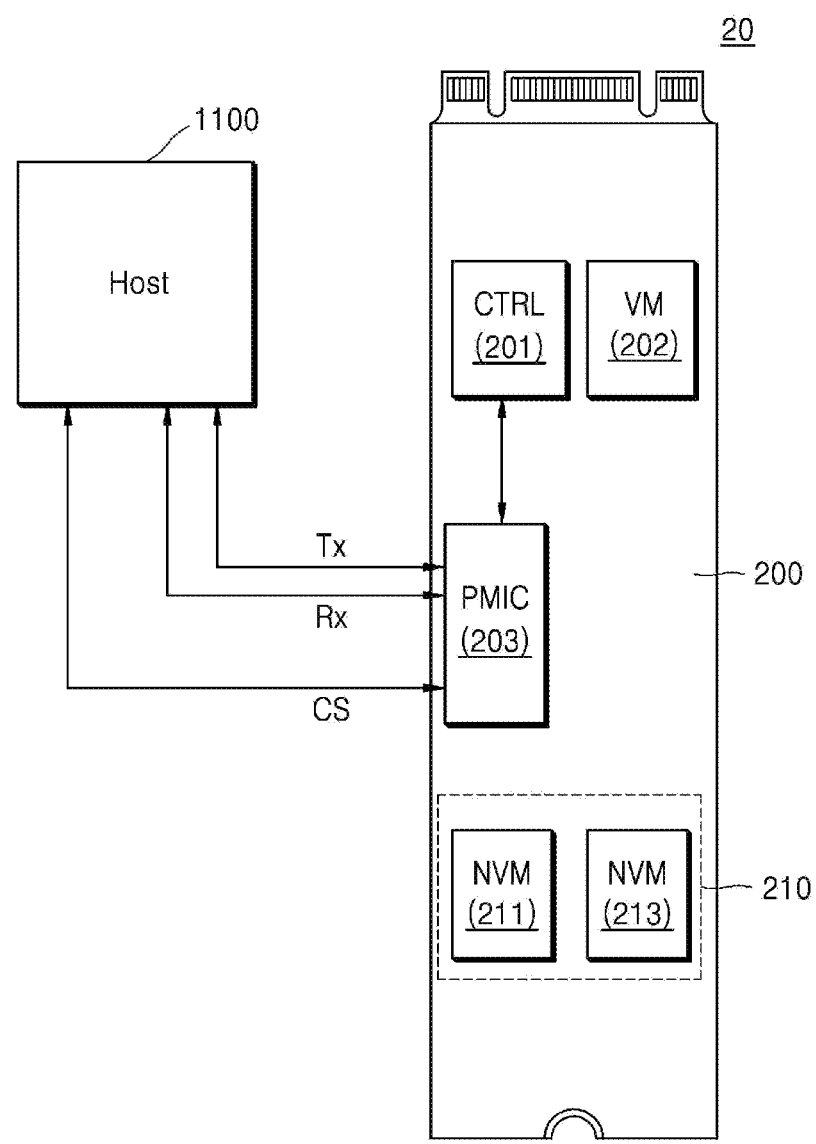
FIGS. 9A to 9C are conceptual diagrams illustrating communication channels between a host and a storage device in a storage system according to an example embodiment.
Figure 9B:
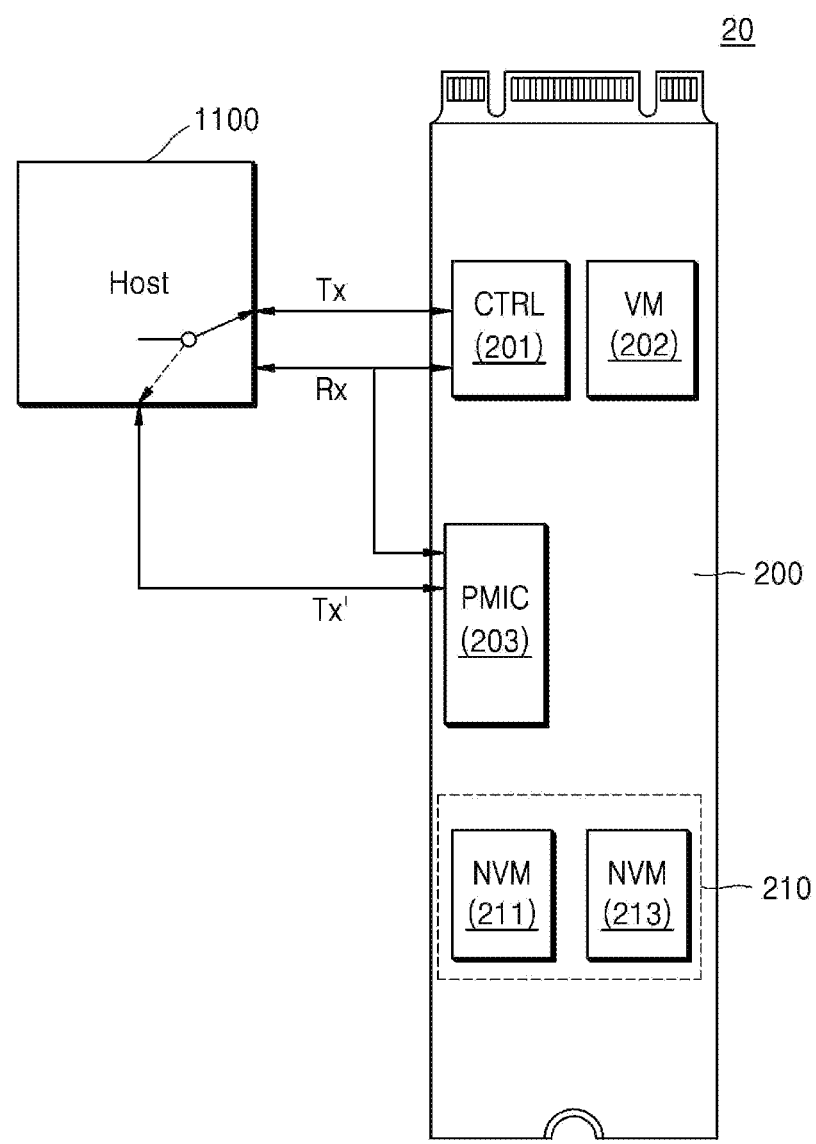
Figure 9C:
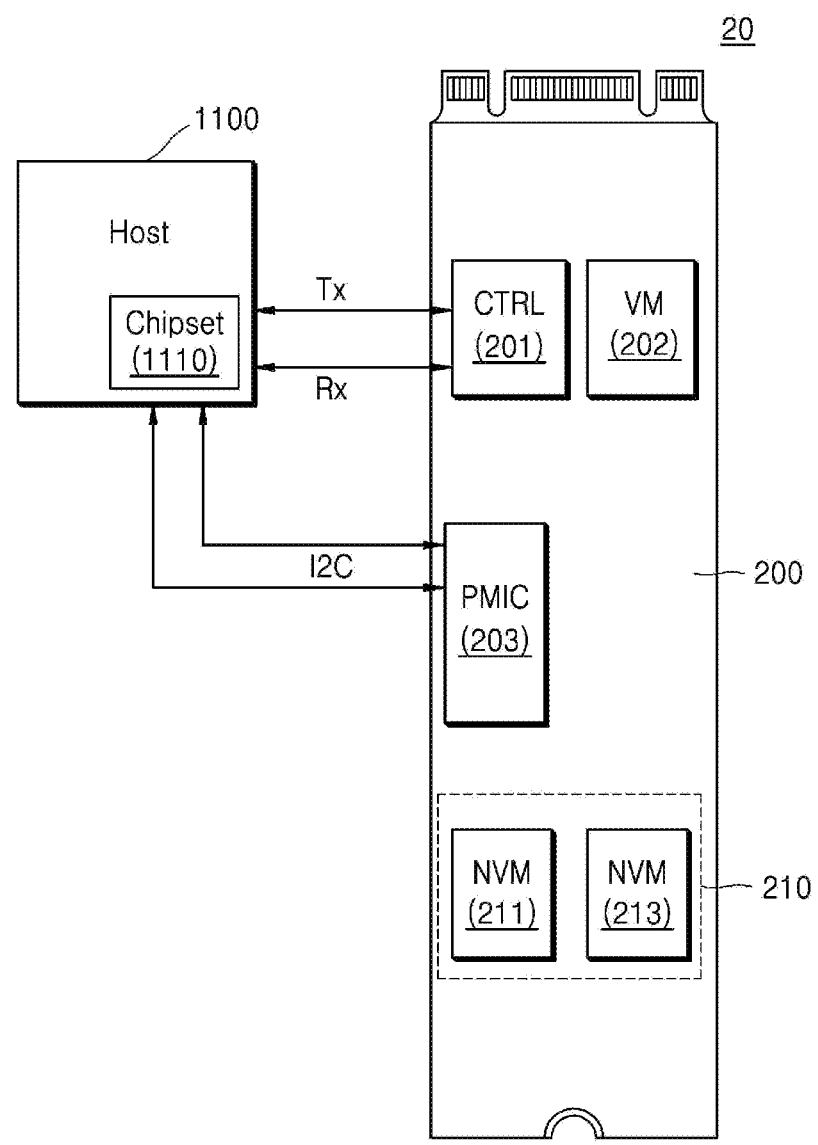

FIGS. 9A to 9C are conceptual diagrams illustrating communication channels between a host and a storage device in a storage system according to an example embodiment.

In FIGS. 9A to 9C, the host 1100 controls a multiple interface communication channel to select some of the storage devices 20 in FIG. 7 and check whether power failure is occurring in non-volatile memories 210 of the selected storage devices 20. That is, the host 1100 may be configured to control a communication channel with and/or over multiple interfaces and may be said therefore to control a multiple interface communication channel to select some of the storage devices 20 and check whether power failure is occurring in non-volatile memories 210 of the selected storage devices 20. The ability to communicate over multiple interfaces as described herein may be referred to as multiple interface communication, and the multiple interfaces may be, for example, different types and/or instantiations of interfaces, such as different types of interfaces that implement different standards and/or protocols. The host 1100 may communicate with the storage devices 20 over the multiple interfaces in multiple interface communication simultaneously, within the same time period, and/or at different times.

Referring to FIG. 9A, the host 1100 selects some of the storage devices 20 of FIG. 7 through the chip selection channel CS, directly performs transmission Tx and reception Rx of the state of the power to and from the power management integrated circuit chips 203 of the selected storage devices, and transmits and receives the state of the power to and from the controller using a bypass.

Referring to FIG. 9B, the host 1100 may include a first channel for performing the transmission Tx and the reception Rx of the state of the power to and from power management integrated circuit chips 203 of the selected storage devices 20 and a second channel for performing the transmission Tx' and the reception Rx of the state of the power to and from the controller 201. Channels for the transmission Tx and the transmission Tx' may be selected by a relay or a switch. In other words, the first channel and the second channel may include the same interface communication channels.

Referring to FIG. 9C, the host 1100 may include a first channel for communicating with the power management integrated circuit chips 203 of the selected storage devices 20 according to an I2C interface and the second channel for performing the transmission Tx and the reception Rx of the state of the power to and from the controller 201. The first channel and the second channel may be selected by the chipset 1110. In other words, the first channel and the second channel may include different interface communication channels, and the communications may therefore be characterized as multiple interface communications.

Figure 10A:
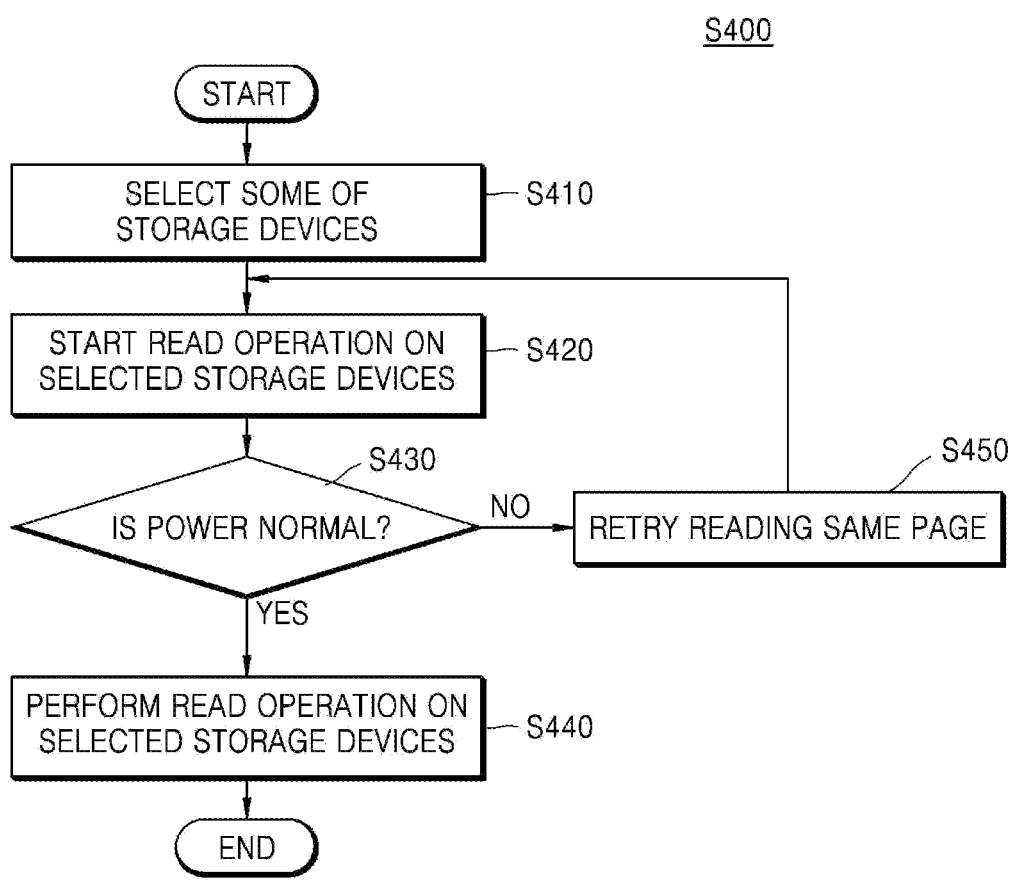
FIGS. 10A and 10B illustrate flowcharts for program codes for read/write operations in a storage system according to an example embodiment.
Figure 10B:
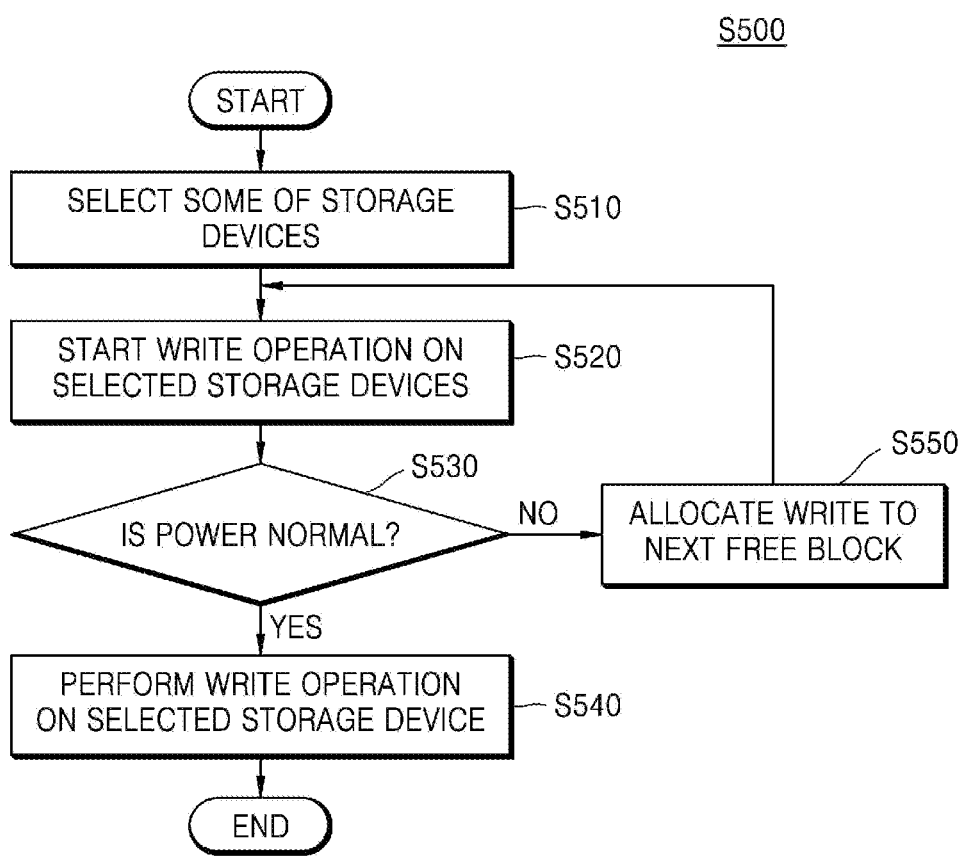

FIGS. 10A and 10B illustrate flowcharts for program codes for read/write operations in a storage system according to an example embodiment.

Most of operations constituting a program code S400 for a read operation and a program code S500 for a write operation described below are substantially the same as or similar to those described above with reference to FIGS. 5A and 5B. Therefore, for convenience of explanation, descriptions given below will focus on differences between the program code S400 for a read operation and the program code S500 for a write operation and the program code S100 for a read operation and the program code S200 for a write operation.

Referring to FIGS. 10A and 10B, the program code S400 for a read operation and the program code S500 for a write operation are shown.

The program code S400 for a read operation may include operation S410 for selecting some of multiple storage devices, operation S420 for starting a read operation on selected storage devices, operation S430 for determining whether power is normal, operation S440 for performing a read operation on the selected storage devices, and operation S450 for re-trying reading of the same page. Put another way, when power is abnormal while starting a read operation on a first page or multiple first pages at S440, reading of the first page or multiple first pages is retried at S450. Additionally, while the determining whether power is normal at S430 is described here as occurring before performing the read operation at S440, the determining at S430 may be performed instead or in addition after S440 and even again after S450.

The program code S500 for a write operation may include operation S510 for selecting some of multiple storage devices, operation S520 for starting a write operation on selected storage devices, operation S530 for determining whether power is normal, operation S540 for performing a write operation on the selected storage devices, and operation S550 for allocating a write (e.g., dedicating at least one address and space for a next write operation) to a next free block.

Operations S410 and S510 for selecting some of the storage devices may be performed through the chip selection channel CS (see FIG. 9A) in the storage system 1000 (see FIG. 7).

The read operation and the write operations may be performed in memory cell arrays of the selected storage devices. The determination of whether power is normal during a read operation and a write operation may be implemented through a power failure detection circuit and a program code.

In other words, the program code S400 for a read operation and the program code S500 for a write operation may minimize data loss of the selected storage devices due to external factors like sudden interruption of power supplied from a power management integrated circuit chip. Also, the program code S100 for a read operation and the program code S200 for a write operation may improve data reliability of the selected storage devices in a state where power is unstable.

Figure 11:
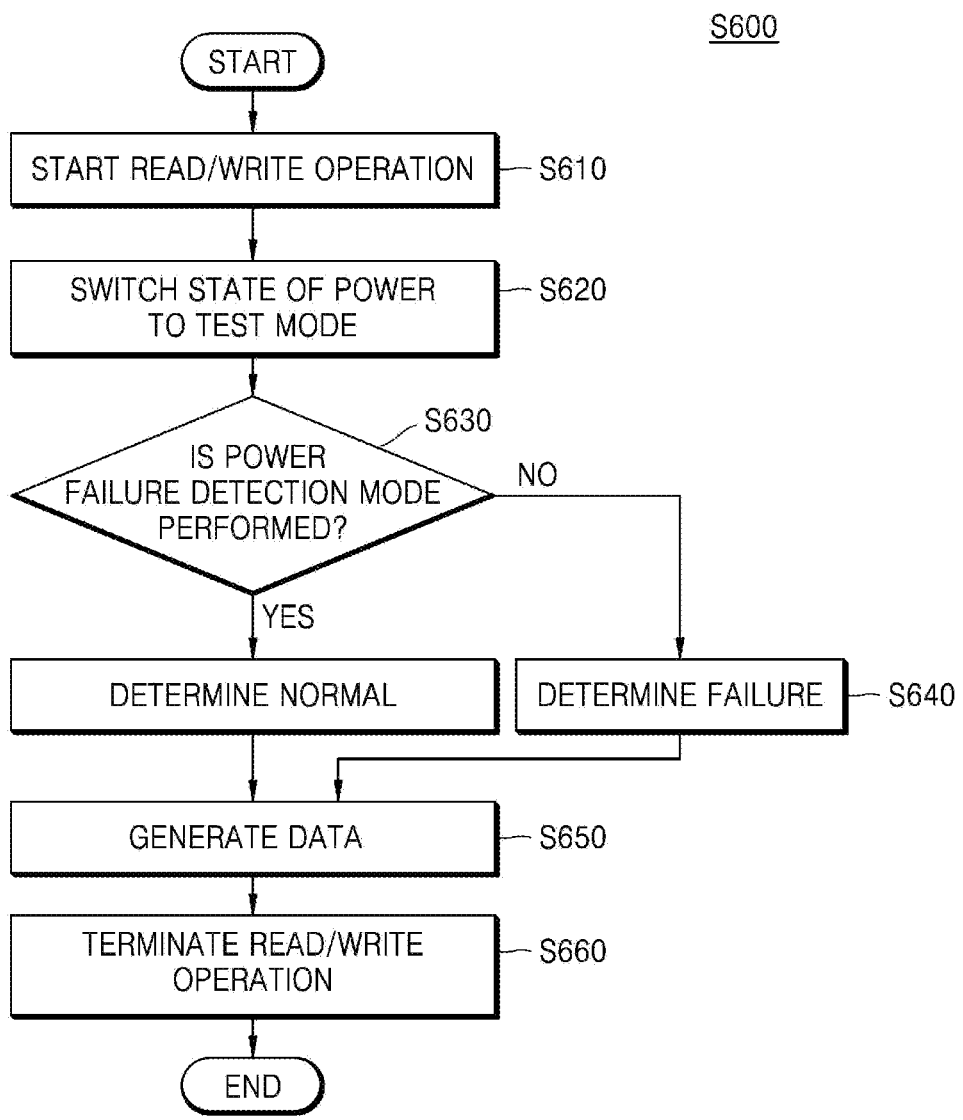
FIG. 11 illustrates a flowchart of determination of a failure of a storage device by using a storage system according to an example embodiment.

FIG. 11 illustrates a flowchart of determination of a failure of a storage device by using a storage system according to an example embodiment.

Referring to FIGS. 7 and 11, determination S600 of a failure of a storage device may be performed by using the storage system 1000.

In some embodiments, the storage system 1000 may further include a monitoring device 1140 that identifies the storage devices 20.

The determination S600 of a failure of a storage device may include operation S610 for starting a read operation and a write operation on a storage device, operation S620 for switching power state to a test mode, operation S630 for determining whether to implement a power failure detection mode on the storage device, operation S620 for determining whether the storage device is normal or abnormal, operation S650 for generating determination data for the storage device, and operation S660 for terminating the read operation and the write operation on the storage device.

In detail, the host 1100 may switch the power state to the test mode while a read operation and a write operation are being performed on non-volatile memories included in the storage devices 20 and collect information regarding whether a power failure detection mode regarding the read operation and the write operation is being implemented normally on the non-volatile memories. The power failure detection mode may be included in program codes of the non-volatile memories. In the test mode, abnormal power with which a read operation and a write operation are not performed normally is provided. That is, the power failure detection mode may be implemented by a program code or program codes included in each of the non-volatile memories, such as when they are executed or processed by the corresponding controller of the non-volatile memories.

Also, the monitoring device 1140 may check information collected by the host 1100 and determine whether the storage devices 20 are normal or abnormal (operation S640) and generate data regarding whether the storage devices 20 are normal or abnormal by analyzing information regarding whether the storage devices 20 are normal (operation S650). Thus, the monitoring device 1140 may be configured to analyze information regarding failure of the storage devices.

Figure 12:
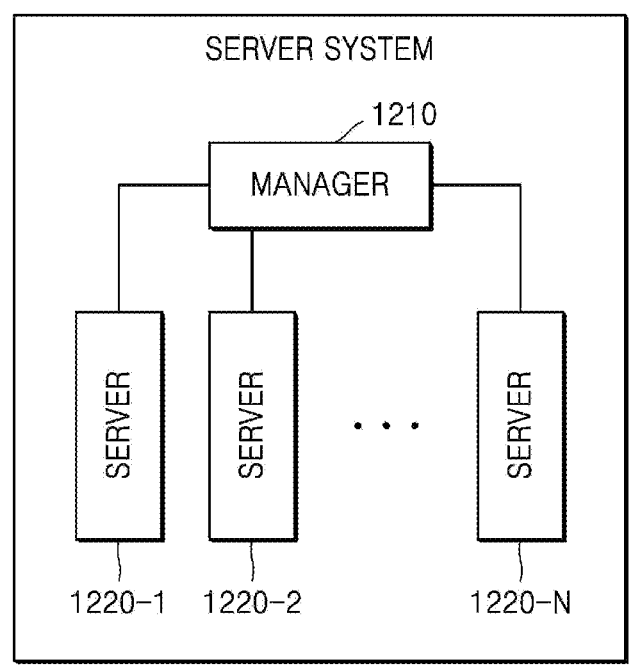
FIG. 12 illustrates a block diagram of a server system to which a storage device according to an example embodiment may be applied.

FIG. 12 illustrates a block diagram of a server system to which a storage device according to an example embodiment may be applied.

Referring to FIG. 12, a server system 1200 may include multiple servers 1220-1 to 1220-N. The servers 1220-1 to 1220-N may be connected to a manager 1210.

Each of the servers 1220-1 to 1220-N may include a storage device according to the present disclosure. A storage device according to the present disclosure may prevent an error of a read operation and a write operation due to power failure of a storage device in advance in a manner similar to implementation of a defense code in the storage device, by performing a self-diagnosis of power failure detection during a read operation and a write operation with a combination of hardware (a power failure detection circuit of a power management integrated circuit chip and/or a controller and/or a non-volatile memory that stores program codes) and software (program codes).

Figure 13:
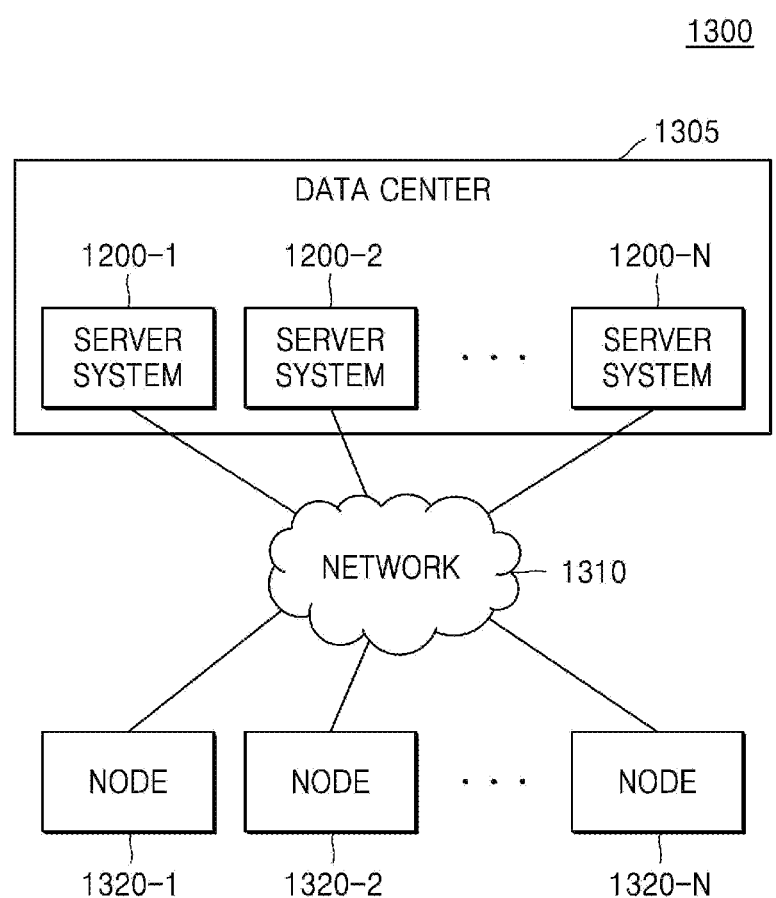
FIG. 13 illustrates a block diagram of a server cluster to which a storage device according to an example embodiment may be applied.

FIG. 13 illustrates a block diagram of a server cluster to which a storage device according to an example embodiment may be applied.

Referring to FIG. 13, a storage cluster 1300 is being highlighted as a high-performance computing infrastructure capable of quickly calculating vast amounts of data in the age of big data and artificial intelligence (AI).

The storage cluster 1300 may maximize computation performance by configuring a parallel computing environment through large-scale clustering. The storage cluster 1300 may provide a storage to a network or a storage region network based on the capacity of storage memories and flexible arrangement of physical components.

The storage cluster 1300 may include a data center 1305 implemented as multiple server systems 1200-1 to 1200-N. Each of the server systems 1200-1 to through 1200-N may be similar or substantially identical to the server system 1200 described with reference to FIG. 12.

The server systems 1200-1 through 1200-N may communicate with storage nodes 1320-1 to 1320-N via a network 1310 like a computer network or the Internet. The storage nodes 1320-1 to 1320-N need not be arranged in adjacent to one another according to embodiments. For example, each of storage nodes 1320-1 through 1320-N may be any one of a client computer, a server, a remote data center, and a storage system.

Each of server systems receiving requests from the storage nodes 1320-1 to 1320-N from among the server systems 1200-1 to 1200-N may include a storage device according to the present disclosure. A storage device according to the present disclosure may prevent an error of a read operation and a write operation due to power failure of a storage device in advance in a manner similar to implementation of a defense code in the storage device, by performing a self-diagnosis of power failure detection during a read operation and a write operation with a combination of hardware (a power failure detection circuit of a power management integrated circuit chip and/or a controller and/or a non-volatile memory that stores program codes) and software (program codes).

Figure 14:
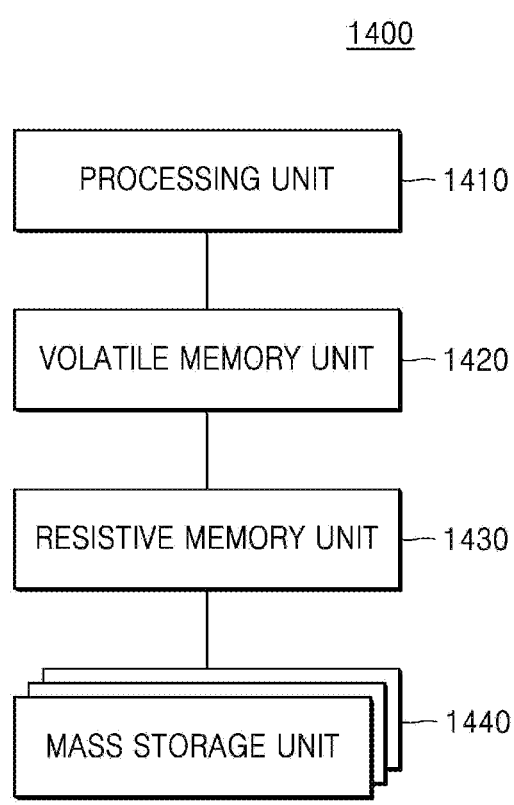
FIG. 14 illustrates a block diagram of a processing system including a storage device according to an example embodiment.

FIG. 14 illustrates a block diagram of a processing system including a storage device according to an example embodiment.

Referring to FIG. 14, a processing system 1400 may include a processing unit 1410, a volatile memory unit 1420, a resistive memory unit 1430, and a large-capacity storage unit 1440. The processing system 1400 may be a general purpose or special purpose computing system like a mobile device, a personal computer, a server computer, and a programmable electronic device, and a mainframe computer.

The processing unit 1410 may execute an operating system and multiple software systems and perform particular calculations or tasks. The processing unit 1410 may be a processor such as a microprocessor or a central processing unit (CPU). The processing unit 1410 may execute instructions stored in and retrieved from a memory to perform some or all aspects of processes described herein.

The volatile memory unit 1420 refers to a medium that stores data for a short-term or temporarily as an operation memory or a cache memory of the processing system 1400. The volatile memory unit 1420 may include one or more memories.

The resistive memory unit 1430 may function as a cache for the large-capacity storage unit 1440. The resistive memory unit 1430 may store an application or some data of the operating system. The resistive memory unit 1430 may include one or more memories.

The large-capacity storage unit 1440 refers to a storage medium in which the processing system 1400 stores user data for a long-term. The large-capacity storage unit 1440 may store application programs or program data.

The large-capacity storage unit 1440 may include a storage device according to the present disclosure. A storage device according to the present disclosure may prevent an error of a read operation and a write operation due to power failure of a storage device in advance in a manner similar to implementation of a defense code in the storage device, by performing a self-diagnosis of power failure detection during a read operation and a write operation with a combination of hardware (a power failure detection circuit of a power management integrated circuit chip and/or a controller and/or a non-volatile memory that stores program codes) and software (program codes).

While the inventive concept(s) described herein have been particularly shown and described with reference to embodiments thereof, it will be understood that various changes in form and details may be made therein without departing from the spirit and scope of the following claims.

What is claimed is:

1. A method comprising:
supplying power from a power management integrated circuit to a plurality of non-volatile memories;
checking a state of the power during a read operation and/or a write operation of each of the plurality of the non-volatile memories;
detecting a power failure when a read voltage and/or a write voltage provided to at least one of the plurality of non-volatile memories is temporality interrupted;
when the power failure is detected in the at least one of the plurality of non-volatile memories, implementing a power failure detection mode and transmitting an alarm signal to an external device; and
when the power is detected to be normal in the at least one of the plurality of non-volatile memories after the alarm signal is transmitted, transmitting an alarm cancellation signal to the external device.

2. The method of claim 1, further comprising performing continuously the read operation while determining whether the power is normal.

3. The method of claim 1, further comprising retrying to read a first page when the power is abnormal while reading the first page.

4. The method of claim 1, further comprising performing continuously the write operation while determining whether the power is normal.

5. The method of claim 1, further comprising writing a first page to a next allocated free block when the power is abnormal while writing to the first page.

6. The method of claim 1, wherein the detecting the power failure is performed by the power management integrated circuit.

7. The method of claim 6, further comprising providing, by the power management integrated circuit, the power failure to the at least one of the plurality of non-volatile memories.

8. The method of claim 1, wherein the power failure is detected using a self-diagnosis operation performed by a controller that controls the at least one of the plurality of non-volatile memories.

9. The method of claim 1, wherein the detecting the power failure is performed using a self-diagnosis operation by the at least one of the plurality of non-volatile memories.

10. A method comprising:
supplying power from a power management integrated circuit to a first non-volatile memory and a second non-volatile memory;
checking a state of the power during a read operation and/or a write operation of the first non-volatile memory and the second non-volatile memory;
detecting, by the power management integrated circuit, an abnormal output of the first nonvolatile memory and/or the second non-volatile memory;
providing an abnormal output status detected by the power management integrated circuit to the first non-volatile memory and/or the second non-volatile memory;
when the abnormal output is detected in the first non-volatile memory and/or the second non-volatile memory, implementing a power failure detection mode and transmitting an alarm signal to an external device; and
when the power is detected to be normal in the first non-volatile memory and/or the second non-volatile memory after the alarm signal is transmitted, transmitting an alarm cancellation signal to the external device.

11. The method of claim 10, wherein the detecting, by the power management integrated circuit, the abnormal output of the first nonvolatile memory and/or the second non-volatile memory includes detecting power failure when a read voltage and/or a write voltage provided to the first non-volatile memory and/or the second non-volatile memory is temporality interrupted.

12. The method of claim 11, further comprising writing a first page to a next allocated free block when the power is abnormal while writing to the first page.

13. The method of claim 11, further comprising performing continuously the write operation while determining whether the power is normal.

14. A method comprising:
supplying power from a power management integrated circuit to a plurality of storage devices, each of the plurality of storage devices including a non-volatile memory;
checking a state of the power during a read operation and/or a write operation of the plurality of storage devices;
detecting a power failure of at least one of the plurality of storage devices by performing a self-diagnosis operation of the at least one of the plurality of storage devices;
when the power failure is detected in the at least one of the plurality of storage devices, implementing a power failure detection mode and transmitting an alarm signal to an external device; and
when the power is detected to be normal in the at least one of the plurality of storage devices after the alarm signal is transmitted, transmitting an alarm cancellation signal to the external device.

15. The method of claim 14, wherein the self-diagnosis operation is performed by a controller of the at least one of the plurality of storage devices.

16. The method of claim 15, wherein the controller performs the self-diagnosis operation by executing a power diagnostic firmware.

17. The method of claim 14, wherein the power failure is detected when a read voltage and/or a write voltage provided to the at least one of the plurality of storage devices is temporarily interrupted.

18. The method of claim 14, wherein the self-diagnosis operation is performed by the non-volatile memory of the at least one of the plurality of storage devices.

19. The method of claim 18, wherein the non-volatile memory of the at least one of the plurality of storage devices stores power diagnostic software which includes information for performing a series of operations for detecting the power failure.

20. The method of claim 14, further comprising writing a first page to a next allocated free block when the power is abnormal while writing to the first page.

\* \* \* \* \*